US008254941B2

(12) United States Patent
Jung et al.

(10) Patent No.: US 8,254,941 B2
(45) Date of Patent: Aug. 28, 2012

(54) APPARATUS AND METHOD FOR RENEWAL-BASED RESOURCE ALLOCATION IN A BROADBAND WIRELESS ACCESS COMMUNICATION SYSTEM

(75) Inventors: Young-Ho Jung, Suwon-si (KR); Won-Hyoung Park, Seoul (KR); Cheol-Woo You, Seoul (KR)

(73) Assignee: Samsung Electronics Co., Ltd (KR)

( * ) Notice: Subject to any disclaimer, the term of this patent is extended or adjusted under 35 U.S.C. 154(b) by 1013 days.

(21) Appl. No.: 11/933,964

(22) Filed: Nov. 1, 2007

(65) Prior Publication Data
US 2008/0102848 A1    May 1, 2008

(30) Foreign Application Priority Data

Nov. 1, 2006 (KR) .......................... 10-2006-0107359
Jun. 26, 2007 (KR) .......................... 10-2007-0063231

(51) Int. Cl.
*H04W 72/00* (2009.01)
(52) U.S. Cl. ........ 455/450; 455/451; 455/509; 455/453; 455/464; 455/452.1; 370/329; 370/330; 370/431; 370/436; 370/437
(58) Field of Classification Search .................. 455/450, 455/451, 452.1–452.2, 453, 454, 509; 370/329–330, 370/341, 395.4, 395.41, 431, 436, 437
See application file for complete search history.

(56) References Cited

U.S. PATENT DOCUMENTS

| 6,718,179 | B1 * | 4/2004 | Forssell et al. ................ 455/509 |
| 2005/0286408 | A1 * | 12/2005 | Jin et al. ........................ 370/208 |
| 2006/0007849 | A1 | 1/2006 | Kim et al. |
| 2006/0195576 | A1 | 8/2006 | Rinne et al. |

FOREIGN PATENT DOCUMENTS

| EP | 1 376 950 | 1/2004 |
| KR | 1020040086355 | 10/2004 |
| KR | 1020050038977 | 4/2005 |
| KR | 1020060078667 | 7/2006 |
| KR | 1020060089366 | 8/2006 |

* cited by examiner

Primary Examiner — Wayne Cai
(74) Attorney, Agent, or Firm — The Farrell Law Firm, P.C.

(57) ABSTRACT

An apparatus and method for renewal-based resource allocation in a Broadband Wireless Access (BWA) system are provided. A Base Station (BS) allocates resources to a Mobile Station (MS) by resource allocation information. It is determined whether the MS requires continuous resource allocation or whether the MS does not have transmission data temporarily, when a resource allocation duration for downlink resources allocated to the MS has expired. One of resource allocation termination, resource allocation renewal, and temporary resource lending to another MS is performed according to the determination. Information for updating the resource allocation information is transmitted to the MS.

22 Claims, 9 Drawing Sheets

TABLE 68 F-SSCH BLOCKS

| BLOCK NAME | HEADER (BINARY) | LENGTH (BITS) | FIELDS | [#BITS] |
|---|---|---|---|---|
| ACCESSGRANT | 0000 | $6+N_{MACID}+N_{RL\_NODEID}+N_{FRID}$ | MACID<br>NODEID<br>FRAMERESD<br>TIMINGADJUST | $[N_{MACID}]$<br>$[N_{RL\_NODEID}]$<br>$[N_{FRID}]$<br>[6] |
| NS-FLAB | 0001 | $9+N_{MACID}+N_{RL\_NODEID}$ | MACID<br>NODEID<br>PF<br>DURATION<br>EXTENDEDTRANSMISSION | $[N_{MACID}]$<br>$[N_{RL\_NODEID}]$<br>[6]<br>[2]<br>[1] |
| NS-MCWFLAB1 | 0010 | $8+N_{MACID}+N_{RL\_NODEID}$ | MACID<br>NODEID<br>PFLAYER1<br>DURATION<br>EXTENDEDTRANSMISSION | $[N_{MACID}]$<br>$[N_{RL\_NODEID}]$<br>[5]<br>[2]<br>[1] |
| NS-MCWFLAB2 | 0011 | $N_{MACID}+4*(N_{EPE\_TX\_ANT}-1)$ | MACID<br>PFLAYER1<br>...<br>PFLAYERN$_{EPE\_TX\_ANT}$ | $[N_{MACID}]$<br>[4]<br><br>[4] |
| NS-SCWFLAB | 0100 | $10+N_{MACID}+N_{FL\_NODEID}$ | MACID<br>NODEID<br>PF<br>NUMLAYERS<br>DURATION<br>EXTENDEDTRANSMISSION | $[N_{MACID}]$<br>$[N_{FL\_NODEID}]$<br>[5]<br>[2]<br>[2]<br>[1] |
| FLAB | 0101 | $8+N_{MACID}+N_{FL\_NODEID}$ | MACID<br>NODEID<br>PF<br>EXTENDEDTRANSMISSION<br>SUPPLEMENTAL | $[N_{MACID}]$<br>$[N_{FL\_NODEID}]$<br>[6]<br>[1]<br>[1] |
| MCWFLAB1 | 0110 | $6+N_{MACID}+N_{FL\_NODEID}$ | MACID<br>NODEID<br>PFLAYER1<br>EXTENDEDTRANSMISSION<br>SUPPLEMENTAL | $[N_{MACID}]$<br>$[N_{FL\_NODEID}]$<br>[5]<br>[1]<br>[1] |
| MCWFLAB2 | 0111 | $N_{MACID}+4*(N_{EPE\_TX\_ANT}-1)$ | MACID<br>PFLAYER2<br>...<br>PFLAYERN$_{EPE\_TX\_ANT}$ | $[N_{MACID}]$<br>[4]<br><br>[4] |

FIG. 1A

TABLE 68 F-SSCH BLOCKS

| BLOCK NAME | HEADER (BINARY) | LENGTH (BITS) | FIELDS | [#BITS] |
|---|---|---|---|---|
| SCWFLAB | 1000 | $9+N_{MACID}+N_{FL\_NODEID}$ | MACID<br>NODEID<br>PE<br>NUMLAYERS<br>EXTENDEDTRANSMISSION<br>SUPPLEMENTAL | $[N_{MACID}]$<br>$[N_{FL\_NODEID}]$<br>[5]<br>[2]<br>[1]<br>[1] |
| RLAB | 1001 | $10+N_{MACID}+N_{RL\_NODEID}+N_{FRID}$ | MACID<br>NODEID<br>FRAMERESID<br>PF<br>EXTENDEDTRANSMISSION<br>SUPPLEMENTAL<br>DELTA | $[N_{MACID}]$<br>$[N_{RL\_NODEID}]$<br>$[N_{FRID}]$<br>[5]<br>[1]<br>[1]<br>[3] |
| NS-RLAB | 1010 | $8+N_{MACID}+N_{RL\_NODEID}+N_{FRID}$ | MACID<br>NODEID<br>FRAMERESID<br>PF<br>DURATION<br>EXTENDEDTRANSMISSION<br>DELTA | $[N_{MACID}]$<br>$[N_{RL\_NODEID}]$<br>$[N_{FRID}]$<br>[5]<br>[1]<br>[1]<br>[3] |
| CCB | 1011 | $6+N_{MACID}$ | MACID<br>ACTIVECARRIERSCHANGE<br>REQCARRIERCHANGE | $[N_{MACID}]$<br>[4]<br>[2] |
| FLAB-HO | 1100 | $10+N_{MACID}+N_{FL\_NODEID}$ | MACID<br>NODEID<br>PF<br>EXTENDEDTRANSMISSION<br>DESIREDSECTOR | $[N_{MACID}]$<br>$[N_{FL\_NODEID}]$<br>[6]<br>[1]<br>[3] |
| RLAB-HO | 1101 | $9+N_{MACID}+N_{RL\_NODEID}+N_{FRID}$ | MACID<br>NODEID<br>FRAMERESID<br>PF<br>EXTENDEDTRANSMISSION<br>DESIREDSECTOR | $[N_{MACID}]$<br>$[N_{RL\_NODEID}]$<br>$[N_{FRID}]$<br>[5]<br>[1]<br>[3] |

APPARATUS AND METHOD FOR RENEWAL-BASED RESOURCE ALLOCATION IN A BROADBAND WIRELESS ACCESS COMMUNICATION SYSTEM

PRIORITY

This application claims priority under 35 U.S.C. §119(a) to Korean Patent Applications filed in the Korean Intellectual Property Office on Nov. 1, 2006 and assigned Serial No. 2006-0107359, and on Jun. 26, 2007 and assigned Serial No. 2007-0063231, the disclosures of which are incorporated herein by reference.

BACKGROUND OF THE INVENTION

1. Field of the Invention

The present invention relates generally to an apparatus and method for renewal-based resource allocation in a Broadband Wireless Access (BWA) system, and more particularly, to an apparatus and method for renewal-based resource allocation so as to minimize the amount of downlink/uplink control information required for resource allocation.

2. Description of the Related Art

In general, the developmental works of communication systems have focused on voice service. These communication systems are currently under development to additionally provide data service and a variety of multimedia services beyond voice service. A voice-oriented communication system has limitations in meeting ever-increasing user demands for services because of relatively narrow bandwidth and high price. In addition, with the development of communications technology and the increasing user demands for Internet service, there is an increasing need for a communication system that efficiently provides Internet service. In response to these needs, a BWA system has been introduced to provide an efficient Internet service in a band broad enough to meet the rapidly increasing user demands.

The BWA system is designed to support standard voice service as well as a variety of low-speed and high-speed data services and multimedia application services including high-quality moving pictures in an integrated fashion. This BWA communication system allows for connectivity to a Public Switched Telephone Network (PSTN), a Public Switched Data Network (PSDN), Internet, an International Mobile Telecommunications2000 (IMT2000) network, and an Asynchronous Transfer Mode (ATM) network through wireless media using broad bands of 2, 5, 26, and 60 GHz under a mobile or fixed environment. The BWA communication system also provides a channel transmission rate of about 2 Mbps or higher. BWA systems are classified into a broadband wireless subscriber network, a broadband mobile access network, and a high-speed Wireless Local Area Network (WLAN) according to terminal mobility (fixed, mobile), communication environment (indoor, outdoor), and channel transmission rate.

International standardization organizations, Institute of Electrical and Electronics Engineers (IEEE) 802.16 and IEEE 80.20 groups, are currently developing the standardization of wireless Access for the BWA system. The BWA system adopts Orthogonal Frequency Division Multiplexing (OFDM)/Orthogonal Frequency Division Multiple Access (OFDMA) for physical channels. Since a physical channel signal is transmitted on a plurality of subcarriers in OFDM/OFDMA, high-speed transmission is enabled.

The BWA system transmits information concerning resources allocated to each user and the operation mode of the resources by a MAP or on a broadcasting channel, such as, for example, a shared signaling channel. The operation mode information may include information about a channel coding type, a coding rate, a Hybrid Automatic Repeat reQuest (HARQ) type, or a Multiple-Input Multiple-Output (MIMO) scheme.

As services provided by communication systems have evolved from voice to data, resource allocation has become more complex. For voice service, resource allocation is relatively simple because the voice service is a circuit-switched service and thus a certain amount of resources are allocated to a particular user during a session. In contrast, since the data service is a packet-switched service, resources should be dynamically allocated while a session is maintained, thereby rendering resource allocation complex. The complex resource allocation leads to an increase in the amount of resource allocation information that is periodically or non-periodically provided to users. In particular, a system aiming at high-speed wireless communication service has many factors that increase the amount of resource allocation information, inclusive of a short scheduling period and a dynamic selection of a modulation scheme according to channel status. Hence, a resource allocation information transmission mechanism significantly affects system throughput.

In a conventional IEEE 802.16e system, a Base Station (BS) broadcasts downlink/uplink information required for Mobile Stations' (MSs') access to the BS in every resource allocation duration. The information is collectively called MAP information, and individually a downlink MAP (DL-MAP) and an uplink MAP (UL-MAP). The MAP information is delivered at the start of a frame. Upon receipt of the MAP information, an MS interprets the MAP information and accesses the BS on the downlink and uplink in bursts indicated by MAP Information Elements (IEs), i.e. DL/UL-MAP IEs included in the MAP information. To be more specific, the MS monitors the existence of its Connection Identifier (CID) in the DL/UL-MAP IEs. In the presence of the CID, the MS transmits/receives data based on additional information included in the DL/UL-MAP IEs such as operation mode information. If resources are continuously allocated to the MS as with a circuit-switched service, the BS has to transmit resource allocation information to the MS every allocation duration.

Figure 1A:
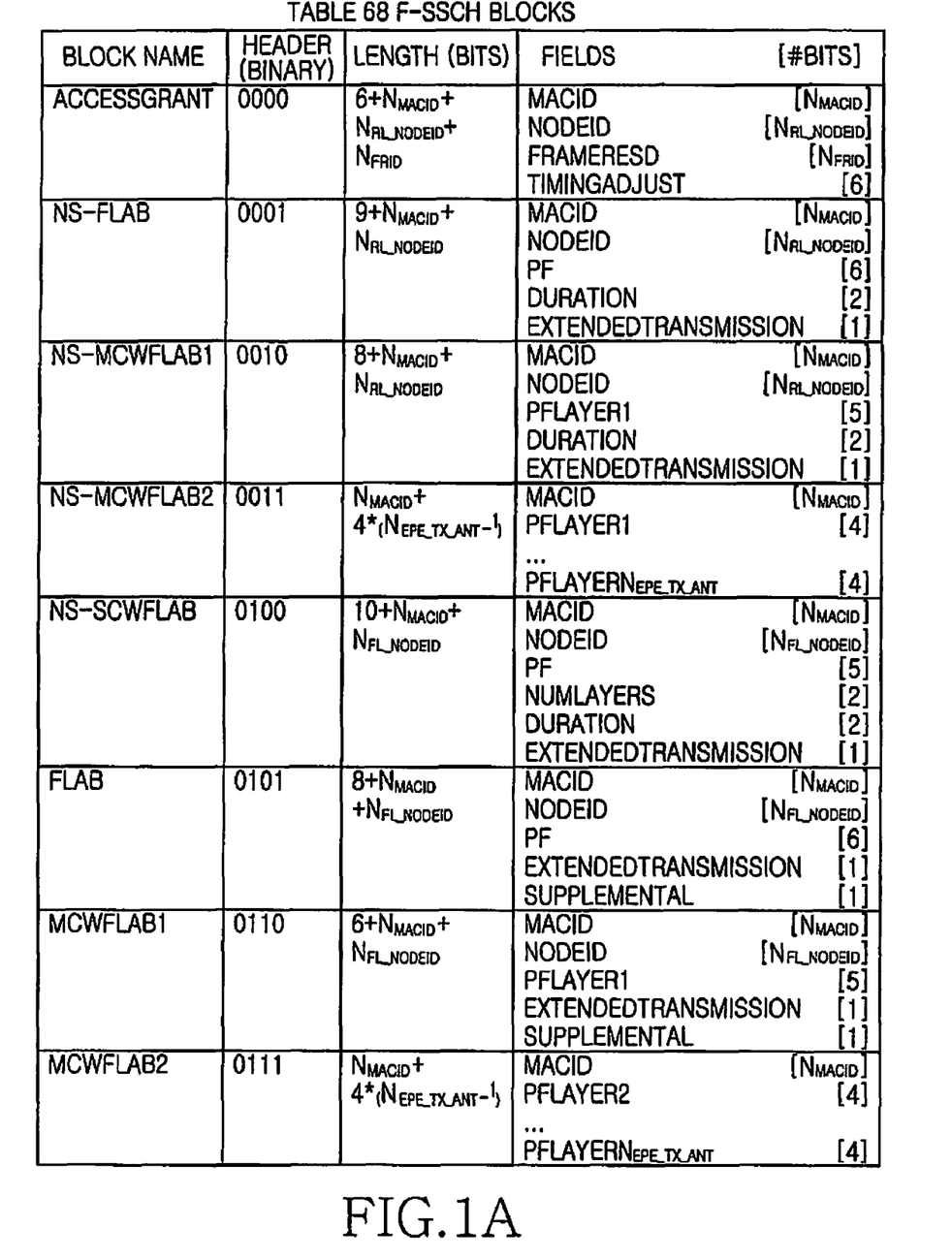
FIGS. 1A and 1B are diagrams illustrating operation mode information defined for an IEEE 802.20 MBFDD/MBTDD system.
Figure 1B:
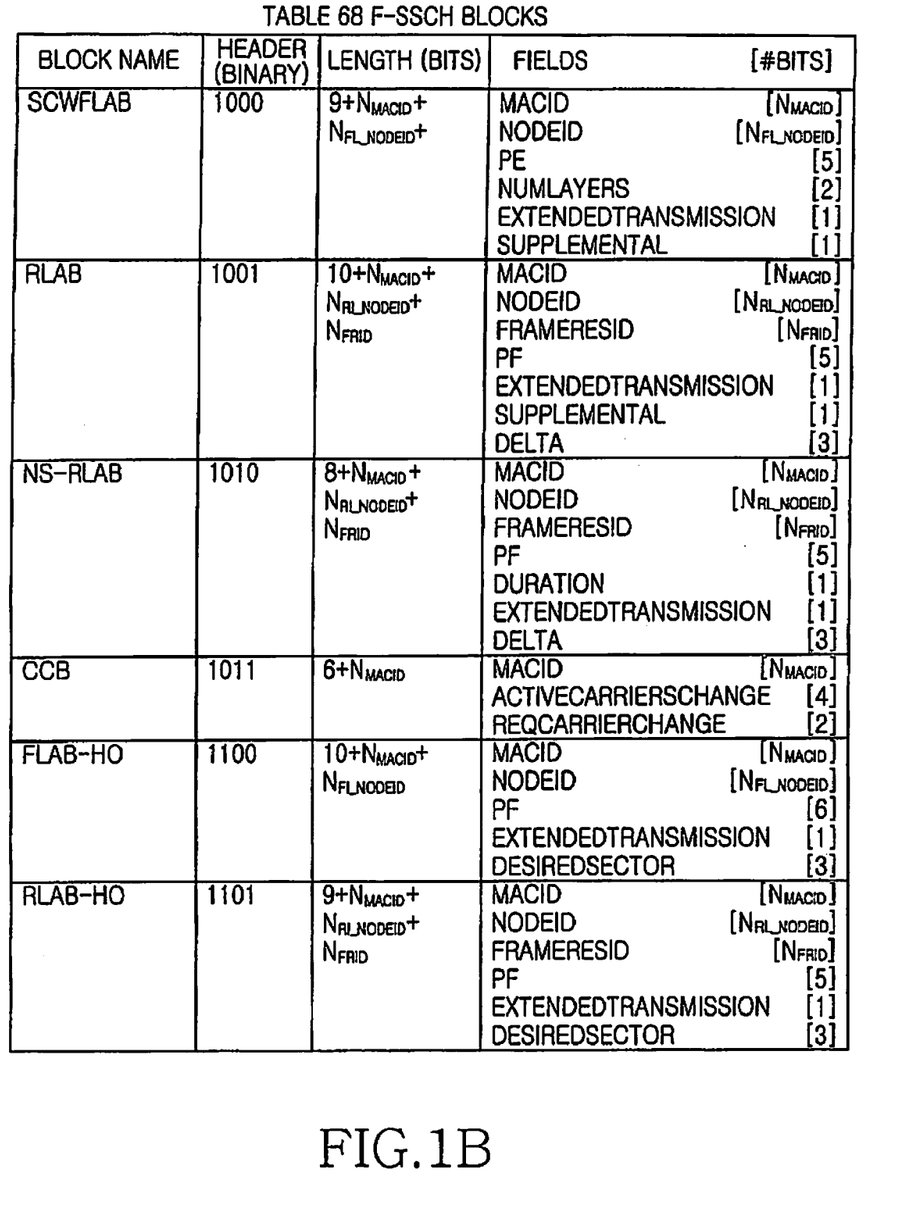

In accordance with IEEE 802.20 Mobile Broadband Frequency Division Duplex (MBFDD)/Mobile Broadband Time Division Duplex (MBTDD) draft, resource allocation information for each user is transmitted in a separately procured encoding block in every physical frame (resource allocation unit). As illustrated in FIGS. 1A and 1B, various pieces of allocation information are distinguished by headers. For each resource allocation mode, a sticky channel allocation scheme is characterized in that once particular radio channel resources are allocated to an MS, they are maintained until the allocation is released. Thus, if allocated resources are kept, the amount of resource allocation can be reduced. However, during the temporary absence of transmission data in allocated resources dedicated to the MS, the resources are used just for the MS to notify that the connection is kept rather than for other users. That is, the resources are wasted. Also, sticky channel allocation and non-sticky channel allocation should be distinguished for each resource allocation mode, thus increasing the bit number of a header for mode identification.

Accordingly, there exists a need for a resource allocation method, which if continuous resource allocation is required for a user, obviates the need for transmitting resource allocation information with a large overhead each time and allows resources of the user to be used for another user, when the user is placed in a short idle period.

SUMMARY OF THE INVENTION

The present invention has been made to address at least the above problems and/or disadvantages and to provide at least the advantages described below. Accordingly, an aspect of the present invention provides an apparatus and method for allocating downlink/uplink resources based on renewal in a BWA system.

Another aspect of the present invention provides an apparatus and method for allocating resources so as to minimize the amount of downlink/uplink control information required for resource allocation in a BWA system.

A further aspect of the present invention provides an apparatus and method for resource allocation, which if continuous resource allocation is required for a user, obviates the need for transmitting resource allocation information with a large overhead each time and allows resources of the user to be used for another user, when the user is placed in a short idle period, to thereby reduce resource consumption.

In accordance with an aspect of the present invention, a method for allocating resources in a BS in a wireless access system is provided. Resources are allocated to an MS by resource allocation information. A determination is made as to at least one of whether the MS requires continuous resource allocation and whether the MS does not have transmission data temporarily. When a resource allocation duration for downlink resources allocated to the MS has expired, one of resource allocation termination, resource allocation renewal, and temporary resource lending to another MS is performed according to the determination. Information for updating the resource allocation information is transmitted to the MS.

In accordance with another aspect of the present invention, a method for receiving resource allocation information in an MS in a wireless access system is provided. Resources for which a privileged use is given to the MS are allocated from a BS by resource allocation information. Information for updating the resource allocation information is received from the BS, if a resource allocation duration for downlink resources allocated to the MS has expired.

In accordance with a further aspect of the present invention, an apparatus of a BS in a wireless access system is provided. A resource allocator allocates resources to an MS by resource allocation information. The resource allocator also determines at least one of whether the MS requires continuous resource allocation and whether the MS does not have transmission data temporarily, when a resource allocation duration for downlink resources allocated to the MS has expired. The resource allocator further performs one of resource allocation termination, resource allocation renewal, and temporary resource lending to another MS according to the determination. An update information transmitter transmits information for updating the resource allocation information to the MS.

In accordance with still another aspect of the present invention, an apparatus of an MS in a wireless access system is provided. A MAP interpreter is allocated resources for which a privileged use is given to the MS from a BS by resource allocation information. The MAP interpreter performs one of terminating use of the allocated resources, continuing using the allocated resources, and waiting for a lending period and resuming use of the allocated resources, according to information for updating the resource allocation information received from an update information receiver. The update information receiver provides the information for updating the resource allocation information received from the BS to the MAP interpreter.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention are described in detail with reference to the accompanying drawings. The same reference numbers are used throughout the drawings. Detailed descriptions of constructions or processes known in the art may be omitted to avoid obscuring the subject matter of the present invention.

The present invention provides an apparatus and method for renewal-based resource allocation in a BWA system.

While the following description is made in the context of an IEEE 802.20-like individual resource allocation information transmission scheme, embodiments of the present invention may also apply to an IEEE 802.16e-like full resource allocation information transmission scheme. Transmission of resource allocation information in the same form according to the embodiments of the present invention will be described below without discrimination between users requiring continuous resource allocation and non-continuous resource allocation. However, embodiments of the present invention may limit the resource allocation information to users requiring continuous resource allocation. Unless separate information is delivered otherwise, a renewal takes place in every duration set during an initial resource allocation. If additional information is easily transmitted as with data piggyback, information about a renewal period can be additionally set.

Figure 2:
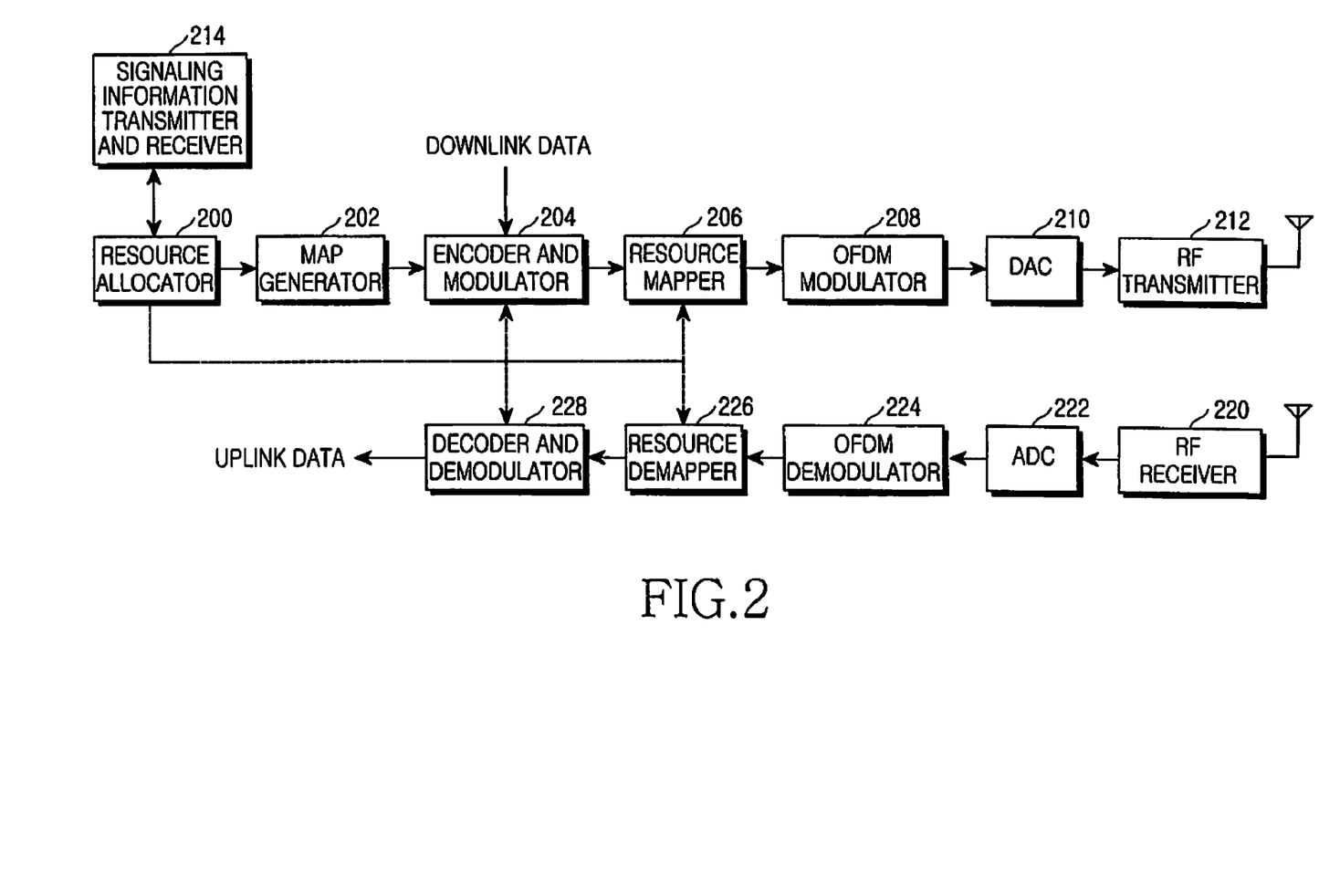
FIG. 2 is a block diagram illustrating a BS in a BWA system according to an embodiment of the present invention.

FIG. 2 is a block diagram illustrating a BS in a BWA system according to an embodiment of the present invention. The BS includes a resource allocator 200, a MAP generator 202, an encoder and modulator 204, a resource mapper 206, an OFDM modulator 208, a Digital-to-Analog Converter (DAC) 210, a Radio Frequency (RF) transmitter 212, a signaling information transmitter and receiver 214, an RF receiver 220, an Analog-to-Digital Converter (ADC) 222, an OFDM demodulator 224, a resource demapper 226, and a decoder and demodulator 228.

A description will first be made of an operation of the BS for scheduling downlink/uplink resources, generating and transmitting MAP information according to the scheduling result, and transmitting downlink data to an MS to which downlink resources are allocated.

Referring to FIG. 2, the resource allocator 200 schedules resources based on channel information (e.g. Channel Quality Information (CQI)), a required bandwidth, and a service type for each MS. According to the present invention, the resource allocator 200 allocates downlink/uplink resources to MSs and gives privilege or a temporary use right to the MSs. For a user with a temporary use right, on the downlink, the resource allocator 200 allocates resources to the MS only for an allocation duration. For a privileged user, the resource allocator 200 terminates the resource allocation, reallocates the resources, or lends the resources to another MS for a rental period by transmitting termination signaling information, renewal signaling information, or lend signaling information to the MS. The action of the resource allocator with respect to the privileged user depends on a decision at the end of an allocation duration as to whether the MS needs continuous resource allocation and does not have transmission data temporarily. On the uplink, the resource allocator 200 terminates the resource allocation, reallocates the resources, or lends the resources to another MS for a rental period based on termination signaling information, renewal signaling information, or lend signaling information received from the MS at the end of an allocation duration. The resource allocator 200 controls overall transmission and reception of the BS according to the scheduling result.

The MAP generator 202 generates MAP information (DL-MAP and UL-MAP) based on the scheduling result received from the source allocator 200. The MAP information includes resource allocation information (see Table 1) for the MSs. The encoder and modulator 204 encodes and modulates downlink data and the MAP information in a predetermined scheme. The resource mapper 206 maps the coded and modulated data to predetermined resources. The resource allocator 200 controls the operations of the encoder and modulator 204 and the resource mapper 206 to transmit the downlink data to the MSs to which downlink resources are allocated.

The OFDM modulator 208 OFDM-modulates the mapped data received from the resource mapper 206, thus creating OFDM symbols. The OFDM modulation involves Inverse Fast Fourier Transform (IFFT), Cyclic Prefix (CP) insertion, etc. The DAC 210 converts the sample data received from the OFDM modulator 208 to an analog signal. The RF transmitter 212 upconverts the baseband signal received from the DAC 210 to an RF signal and transmits the RF signal through an antenna.

The signaling information transmitter and receiver 214 transmits termination signaling information, renewal signaling information, or lend signaling information received from the resource allocator 200 to an MS or transmits termination signaling information, renewal signaling information, or lend signaling information received from an MS to the resource allocator 200.

Upon receipt of the MAP information, the MSs receive the downlink data from the BS and transmit uplink data to the BS, based on the MAP information.

Regarding the reception of uplink data at the BS from the MS, the RF receiver 220 downconverts an RF signal received from the MS to a baseband signal. The ADC 222 converts the baseband analog signal received from the RF receiver 220 to digital sample data. The OFDM demodulator 224 OFDM-demodulates the sample data and outputs subcarrier values. The OFDM demodulation involves CP elimination, Fast Fourier transform (FFT), etc.

The resource demapper 226 extracts data corresponding to the resources allocated to the MS from among the data received from the OFDM demodulator 224. The decoder and demodulator 228 demodulates and decodes the extracted data in a predetermined scheme, thus recovering uplink data transmitted from the MS. The resource allocator 200 controls the operations of the resource demapper 226 and the decoder and demodulator 228 to receive the uplink data from the MS to which the uplink resources have been allocated.

Figure 3:
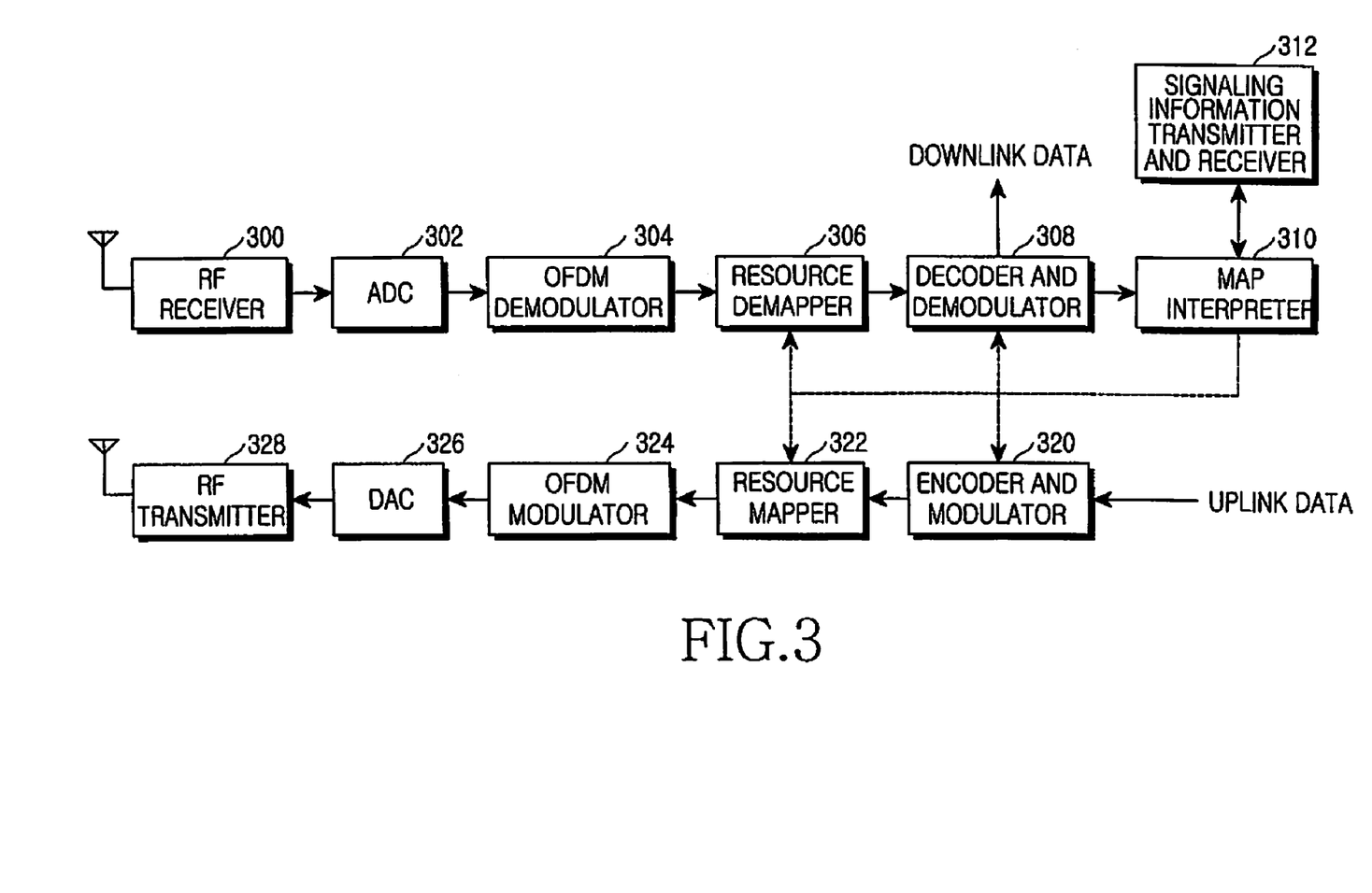
FIG. 3 is a block diagram illustrating an MS in the BWA system according to an embodiment of the present invention.

FIG. 3 is a block diagram illustrating an MS in the BWA system according to an embodiment of the present invention. The MS includes an RF receiver 300, an ADC 302, an OFDM demodulator 304, a resource demapper 306, a decoder and demodulator 308, a MAP interpreter 310, a signaling information transmitter and receiver 312, an encoder and modulator 320, a resource mapper 322, an OFDM modulator 324, a DAC 326, and an RF transmitter 328.

A description will first be made of an operation of the MS for receiving MAP information from the BS and receiving downlink data in uplink resources allocated according to the MAP information.

Referring to FIG. 3, the RF receiver 300 downconverts an RF signal received from the BS to a baseband signal. The ADC 302 converts the baseband analog signal received from the RF receiver 300 to digital sample data. The OFDM demodulator 304 OFDM-demodulates the sample data and outputs subcarrier values. The OFDM demodulation involves CP elimination, Fast Fourier transform (FFT), etc.

The resource demapper 306 extracts MAP information and downlink data in predetermined areas of a frame from the data received from the OFDM demodulator 304. The decoder and demodulator 308 demodulates and decodes the extracted data in a predetermined scheme, thus recovering the MAP information and the downlink data.

The MAP interpreter 310 interprets the MAP information received from the decoder and demodulator 308 and controls overall transmission and reception of the MS based on the MAP information. In particular, depending on whether downlink/uplink resources have been allocated to the MS, the MAP interpreter 310 controls the operations of the resource demapper 306 and the decoder and demodulator 308 to receive downlink data in the allocated downlink resources, and controls the operations of the resource mapper 322 so as to transmit uplink data in the allocated uplink resources. According to an embodiment of the present invention, the MAP interpreter 310 determines whether the MS is allowed a privileged use or a temporary use of the allocated downlink/uplink resources. If the allocated resources are only for temporary use, the MAP interpreter 310 transmits/receives downlink/uplink data only for an allocation duration in the allocated resources. If the allocated resources are privileged for the MS, for downlink resources, the MAP interpreter 310 discontinues occupation of the resources, continues using the resources, or reuses the resources after a lending period according to termination signaling information, renewal signaling information, or lend signaling information received from the BS at the end of an allocation duration. For uplink resources, the MAP interpreter 310 controls transmission of termination signaling information, renewal signaling information, or lend signaling information to the BS in a predetermined signaling scheme at the end of an allocation duration, depending on whether continuous resource occupation is required and there is a temporary absence of transmission data, and accordingly discontinues occupation of the resources, continues using the resources, or reuses the resources after a lending period.

The signaling information transmitter/receiver 312 transmits the termination signaling information, renewal signaling information, or lend signaling information received from the MAP interpreter 310 to the BS, or transmits the termination signaling information, renewal signaling information, or lend signaling information received from the BS to the MAP interpreter 310.

Now a description will be made of an operation of the MS for transmitting uplink data in uplink resources allocated according to the MAP information.

The encoder and modulator 320 encodes and modulates the uplink data in a predetermined scheme. The resource mapper 322 maps the coded and modulated data to the allocated resources.

The OFDM modulator 324 OFDM-modulates the mapped data received from the resource mapper 322. The DAC 326 converts the sample data received from the OFDM modulator 324 to an analog signal. The RF transmitter 328 upconverts the baseband signal received from the DAC 326 to an RF signal and transmits the RF signal to the BS through an antenna.

Figure 4:
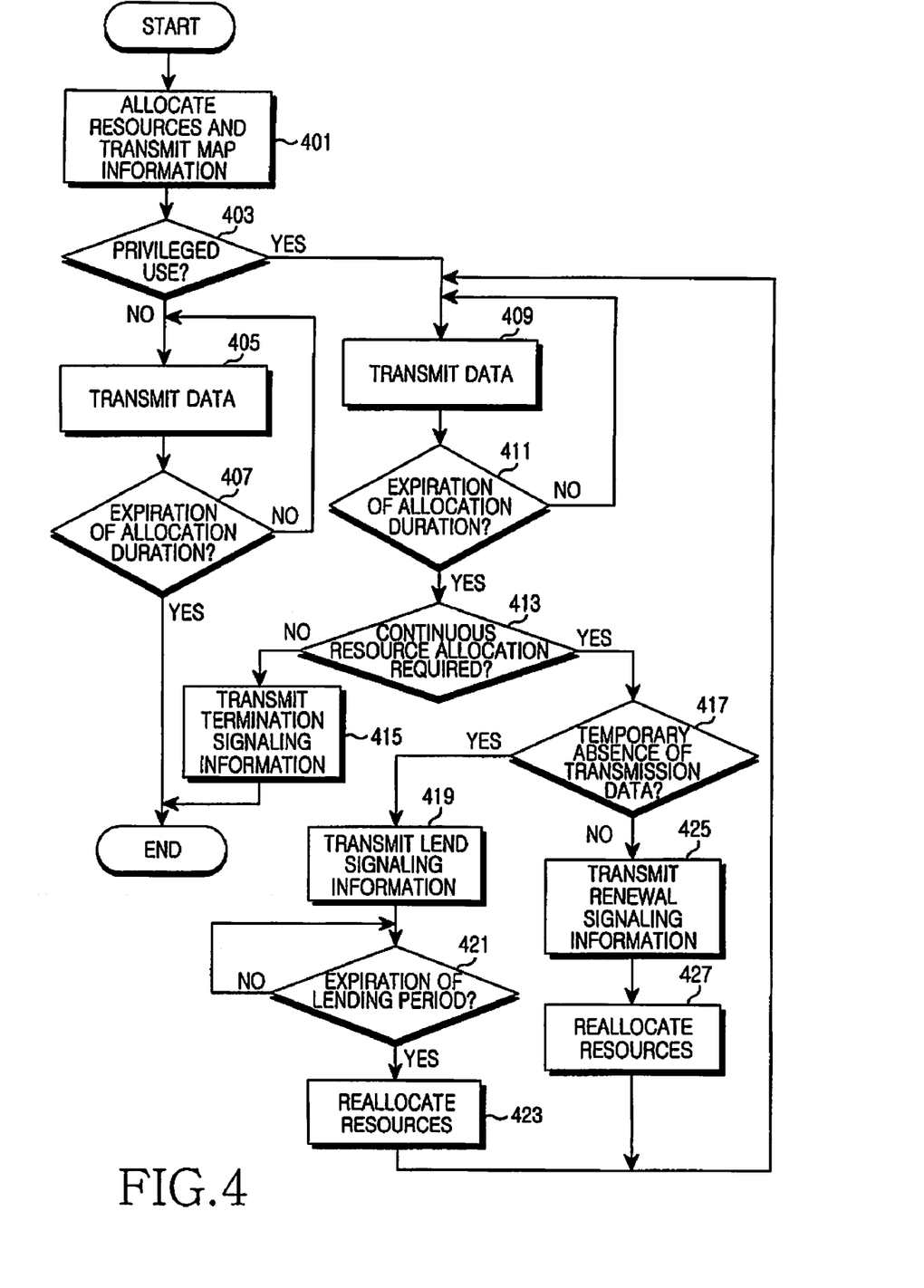
FIG. 4 is a flowchart illustrating a renewal-based resource allocation method for downlink resources in the BS in the BWA system according to an embodiment of the present invention.

FIG. 4 is a flowchart illustrating a renewal-based resource allocation method for downlink resources in the BS in the BWA system according to an embodiment of the present invention.

Referring to FIG. 4, the BS allocates downlink resources to the MS for use during a predetermined duration, and generates and broadcasts full resource allocation information including resource allocation information for the MS, such as MAP information in step 401. By the resource allocation information, the BS allows a privileged use or a temporary use of allocated resources to the MS during an allocation duration specified by the resource allocation information. The use type is identified by a new allocation indicator. The resource allocation information has the following parameters listed in Table 1.

TABLE 1

| | |
|---|---|
| User ID | CID, MACID, or the like |
| Allocated resource position information | One-dimensional indexing and two-dimensional indexing are available. |
| Allocation duration | Basic resource allocation unit (e.g., 4, 8, 12, or 16 frames). |
| Operation mode information | Information about operation mode including Modulation and Coding Scheme (MCS) level, HARQ, and MIMO mode. This information corresponds to IEEE 802.20 header and packet format and IEEE 802.16e Downlink Interval Usage Code (DIUC) and Uplink Interval Usage Code (UIUC). |
| Necessary information for each operation mode | Information fields specific to each operation mode. |
| New allocation indicator | Indicator indicating whether privileged use or temporary use is allowed for resources. |

In step 403, the BS determines whether a privileged use or a temporary use of the allocated resources is given to the MS. If the MS is allowed a temporary use of the allocated resources, the BS transmits downlink data to the MS using the allocated resources in step 405 and monitors whether a resource allocation duration has elapsed for the MS in step 407. If the allocation duration still lasts, the BS returns to step 405. If the allocation duration has elapsed, the BS terminates the resource allocation.

If the resource allocation is about a privileged use of allocated resources to the MS in step 403, the BS transmits the downlink data in the allocated resources to the MS in step 409 and monitors whether the resource allocation duration has elapsed for the MS in step 411. If the allocation duration still lasts, the BS returns to step 409. If the allocation duration has elapsed, the BS determines whether continuous resource allocation is required for the MS in step 413.

If continuous resource allocation is required for the MS, the BS determines whether there is a temporary absence of transmission data for the MS in step 417. If there is a temporary absence of transmission data for the MS, the BS transmits lend signaling information to the MS, notifying that the resource will be lent to another user for a period indicated by the lend signaling information in step 419 and determines whether the lending period has elapsed in step 421. The lend signaling information can be transmitted only when it is necessary to explicitly indicate the resource lending to the privileged MS. If the lending period still lasts, the BS awaits the expiration of the lending period. Upon expiration of the lending period, the BS reallocates the resources to the privileged MS for use for the determined duration in step 423 and returns to step 409. Thus, the MS keeps its privileged use of the resources granted in step 401 and the resources are allocated to another user for the lending period in step 401 through step 407. As a consequence, the resources are not wasted, while the MS is kept connected.

Meanwhile, if there is transmission data for the MS in step 417, the BS transmits renewal signaling information concerning the resource allocation to the MS in step 425. After reallocating the resources to the privileged MS for the determined duration in step 427, the BS returns to step 409. Thus, the MS renews the privileged use of the allocated resources. The renewal signaling information can be transmitted only when it is necessary to explicitly indicate the resource allocation renewal to the privileged MS.

If the resource allocation is not required any longer in step 413, the BS transmits termination signaling information concerning the resource allocation to the MS and terminates the resource allocation in step 415. Then, the BS ends the algorithm of the present invention. In this case, the BS grants the privileged use of the resources to another user.

Explicit transmission of renewal signaling information, termination signaling information, or lend signaling information in relation to downlink resource allocation can be considered in three ways.

In one such way the BS piggybacks information indicating whether the allocated resources are renewed, terminated, or lent onto data at the last transmission time of the allocated resources, if the MS has a data channel. The information can be a 1-bit indicator. Or an indicator of two or more bits can be used to provide additional information such as operation mode change information as well as the renewal, termination or lend signaling information. For example, the piggybacked information may have the following values.

0: renew or lend, 1: not renew (resource allocation termination)
    0: renew, 1: keep connection+lend
    00: renew 01: keep connection+lend (basic allocation unit), 10: keep connection+lend (basic allocation unit× predetermined number), 11: not renew Another way of explicit transmission of renewal signaling information, termination signaling information, or lend signaling information is that the renewal signaling information, termination signaling information, or lend signaling information concerning the resource allocation is transmitted on a separate broadcasting channel. For example, the user ID or the ID corresponding to resource position information of the resources to be renewed, released, or lent is transmitted on the separate broadcasting channel.

The other way is that when the user has a UL ACKnowledgement (ACK) channel, the renewal signaling information, termination signaling information, or lend signaling information is transmitted in the UL ACK signal. For example, a 2-bit UL ACK signal may carry the following information.

00: Negative ACK (NACK), 01: ACK+resource allocation termination, 11: ACK+renew, 10:ACK+lend
 00: NACK, 01: ACK+resource allocation termination, 11: ACK+renew or lend, 10:NACK+renew or lend If the UL ACK signal has more bits, it can carry more information as follows.

000: NACK,
  001: NACK+resource allocation termination
  010: NACK+renew
  011: NACK+keep connection and lend for predetermined period
  100: ACK
  101: ACK+resource allocation termination
  110: ACK+renew
  111: ACK+keep connection and lend for predetermined period The above three methods can be used in combination according to the type of resources (characteristics of DL/UL resources).

It can be further contemplated that two of the renewal signaling information, termination signaling information, and lend signaling information are transmitted explicitly in at least one of the three methods and the other signaling information is not transmitted, virtually implicitly transmitted. For example, provided that the lend signaling information and the renewal signaling information are explicitly transmitted and the termination signaling information is not transmitted, when the MS receives none of the signaling information at the end of the resource allocation, it determines that the resource allocation is terminated. Provided that the lend signaling information and the termination signaling information are explicitly transmitted and the termination signaling information is not transmitted, when the MS receives none of the signaling information at the end of the resource allocation, it determines that the resource allocation is renewed.

Figure 5:
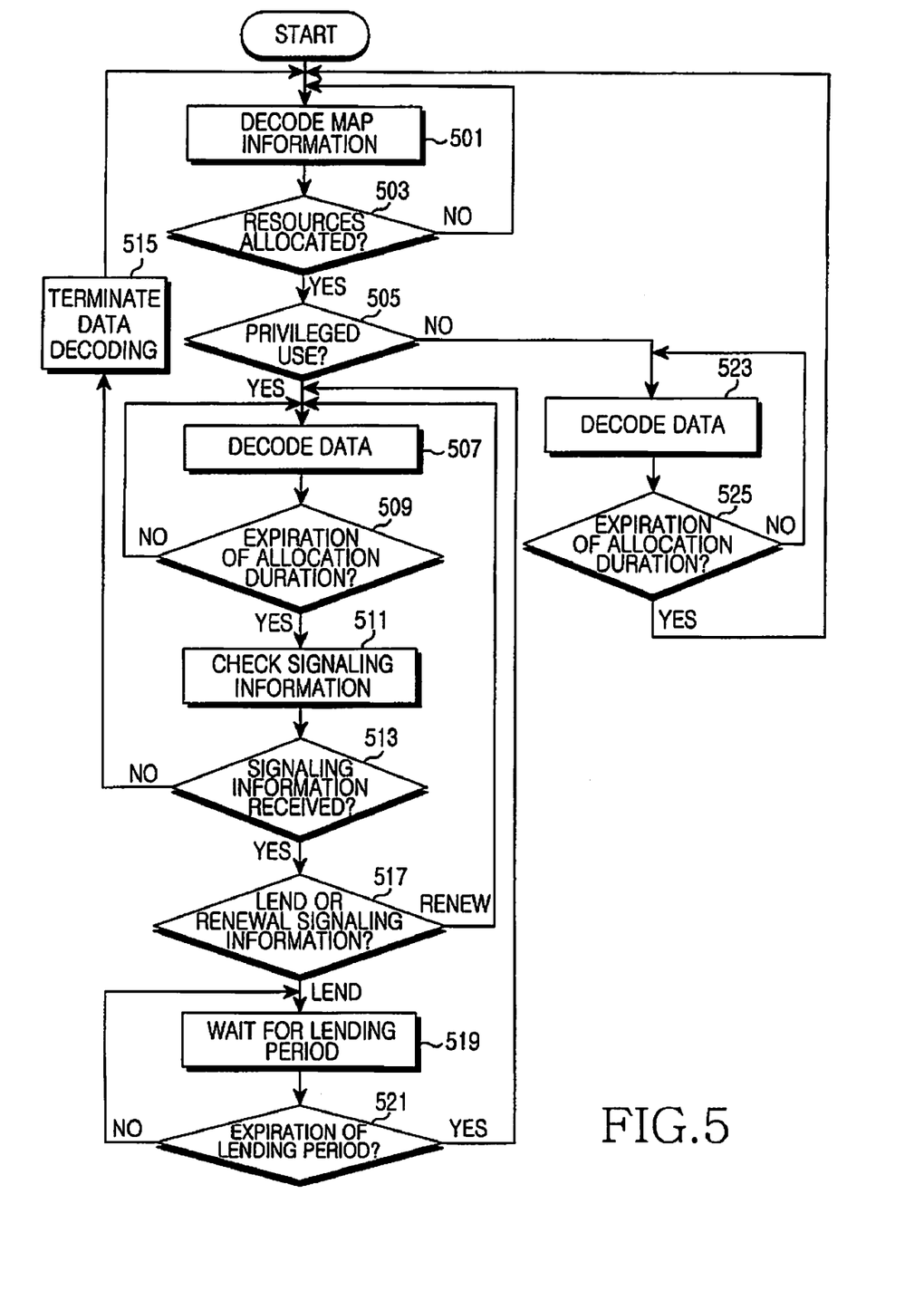
FIG. 5 is a flowchart illustrating a renewal-based resource allocation method for downlink resources in the MS in the BWA system according to an embodiment of the present invention.

FIG. 5 is a flowchart illustrating a renewal-based resource allocation method for downlink resources in the MS in the BWA system according to an embodiment of the present invention. It is assumed herein that the lend signaling information and the renewal signaling information are explicitly transmitted and the termination signaling information is not transmitted, that is, implicitly transmitted.

Referring to FIG. 5, the MS receives full resource allocation information such as MAP information from the BS and decodes it in step 501. In step 503, the MS determines, based on the full resource allocation information, whether new downlink resources have been allocated to it. If new downlink resources have not been allocated, the MS returns to step 501. If new downlink resources have been allocated, the MS determines whether it is given a privileged use or a temporary use concerning the resources in step 505.

If the MS is not privileged to the resources, it decodes downlink data received in the allocated resources during an allocation duration indicated by the resource allocation information in step 523 and determines whether the allocation duration has elapsed in step 525. When the allocation duration has not elapsed, the MS continues to decode data at step 523. Upon expiration of the allocation duration, the MS returns to step 501.

If the MS is privileged to the allocated resources, it decodes downlink data received in the allocated resources during the allocation duration indicated by the resource allocation information in step 507 and determines whether the allocation duration has elapsed in step 509. When the allocation duration has not elapsed the MS continues to decode data at step 507. Upon expiration of the allocation duration, the MS checks signaling information from the BS 511.

In step 513 it is determined if the signaling information is received. If the signaling information does not exist, the MS ends the decoding of the downlink data received in the allocated resources, considering that the resource allocation has been terminated and the privilege to the resources has been withdrawn from the MS in step 515 and returns to step 501. If the signaling information exists, the MS determines whether the signaling information is renewal or lend signaling information in step 517. If the signaling information is renewal signaling information, the MS returns to step 507, considering that the resource allocation has been renewed. If the signaling information is lend signaling information, the MS waits for a lending period for the resources in step 519 and determines whether the lending period has elapsed in step 521. When the lending period has not expired, the MS returns to step 519 to wait for a lending period. Upon expiration of the lending period, the MS returns to step 507.

Figure 6:
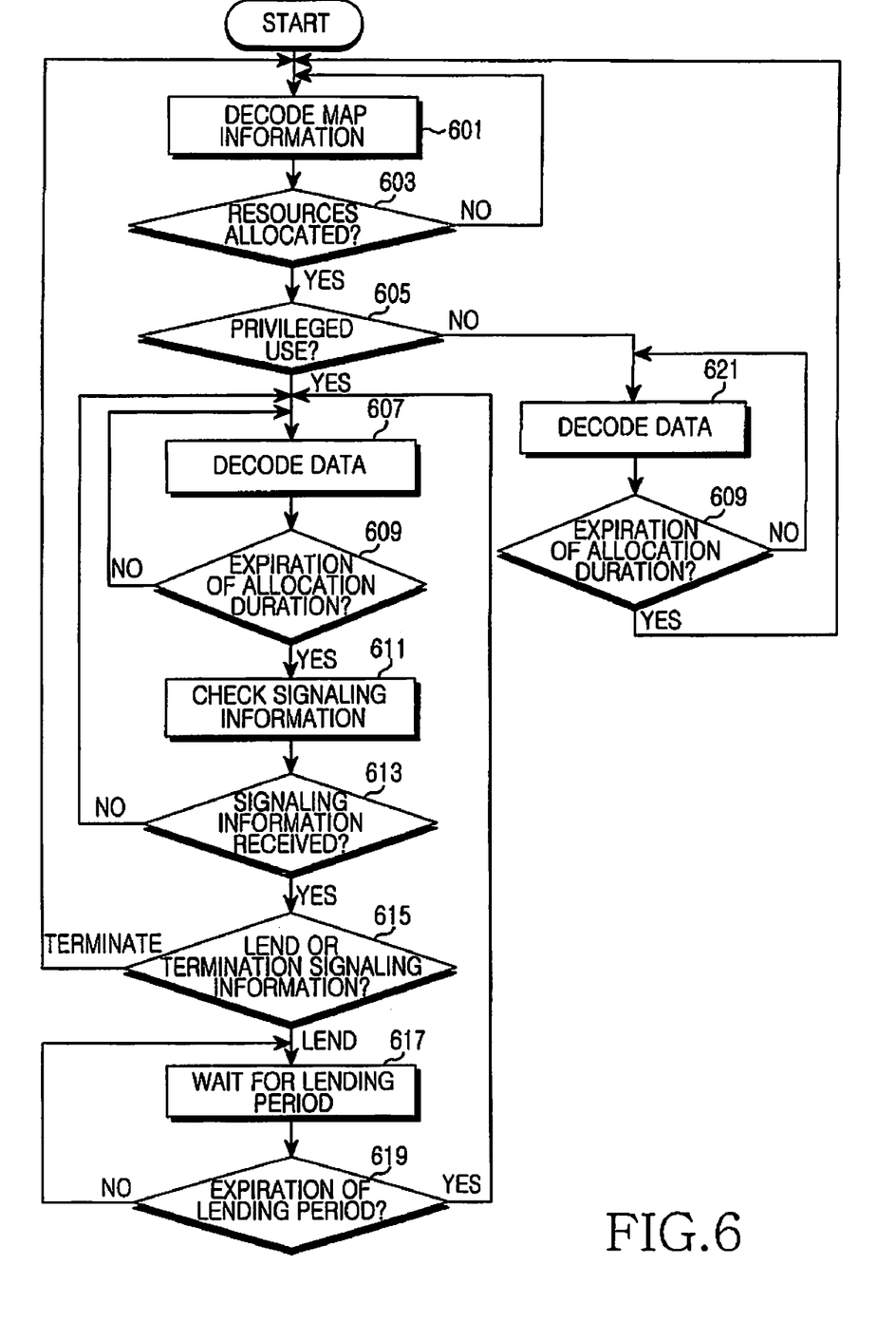
FIG. 6 is a flowchart illustrating a renewal-based resource allocation method for downlink resources in the MS in the BWA system according to another embodiment of the present invention.

FIG. 6 is a flowchart illustrating a renewal-based resource allocation method for downlink resources in the MS in the BWA system according to another embodiment of the present invention. It is assumed herein that the lend signaling information and the termination signaling information are explicitly transmitted and the renewal signaling information is not transmitted, that is, implicitly transmitted. Steps 601 to 611 are identical to steps 501 to 511 of FIG. 5, and steps 621 and 623 are identical to steps 523 and 525 of FIG. 5. Hence, their description is not provided herein.

Referring to FIG. 6, the MS determines whether signaling information has been received in step 613. In the absence of the signaling information, the MS returns to step 607, considering that a privilege to allocated resources has been renewed.

In the presence of the signaling information, the MS determines whether the signaling information is termination or lend signaling information in step 615. If the signaling information is termination signaling information, the MS returns to step 601, considering that the resource allocation has been terminated and the privilege to the resources has been withdrawn from the MS. If the signaling information is lend signaling information, the MS waits for a lending period for the resources in step 617 and determines whether the lending period has elapsed in step 619. When the lending period has not expired, the MS returns to step 617 to wait for a lending period. Upon expiration of the lending period, the MS returns to step 607.

Figure 7:
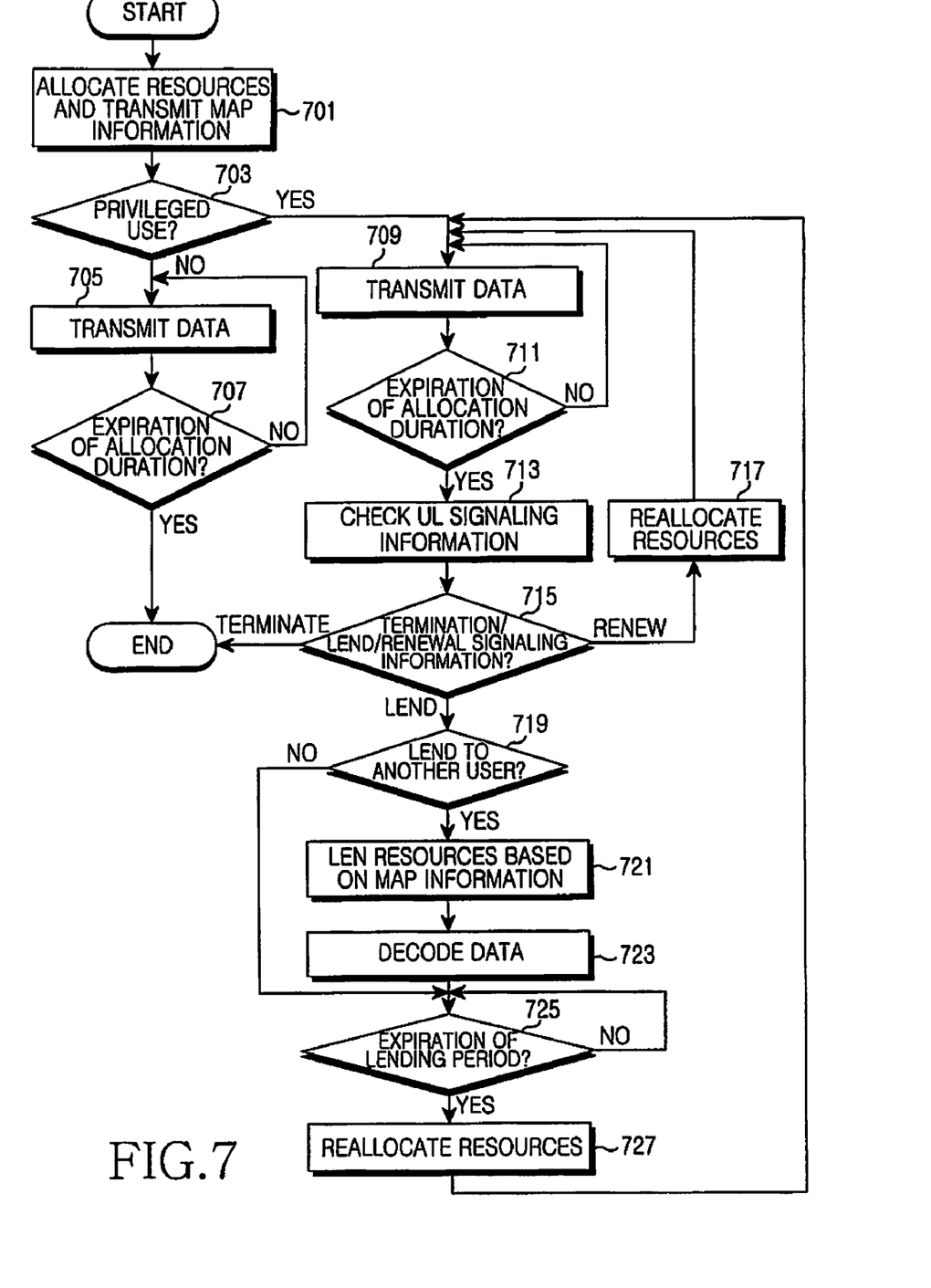
FIG. 7 is a flowchart illustrating a renewal-based resource allocation method for uplink resources in the BS in the BWA system according to an embodiment of the present invention.

FIG. 7 is a flowchart illustrating a renewal-based resource allocation method for uplink resources in the BS in the BWA system according to an embodiment of the present invention.

Referring to FIG. 7, the BS allocates uplink resources to the MS for use during a predetermined allocation duration, and generates and broadcasts full resource allocation information including resource allocation information for the MS, such as MAP information in step 701. By the resource allocation information, the BS allows a privileged use or a temporary use of allocated resources to the MS during the allocation duration specified by the resource allocation information. The use type is identified by a new allocation indicator. The resource allocation information has the parameters listed in Table 1.

In step 703, the BS determines whether a privileged use or a temporary use of the allocated resources is given to the MS. If the MS is allowed a temporary use of the allocated resources, the BS decodes uplink data received in the allocated resources during the allocation duration in step 705 and monitors expiration of the allocation duration in step 707. If the allocation still lasts, the BS returns to step 705. Upon expiration of the allocation duration, the BS terminates the resource allocation and ends the algorithm of the present invention.

If the resource allocation is about a privileged use of allocated resources to the MS in step 703, the BS decodes the uplink data received in the allocated resources during the allocation duration in step 709 and monitors expiration of the allocation duration in step 711. If the allocation duration still lasts, the BS returns to step 709. Upon expiration of the allocation duration, the BS checks UL signaling information from the MS in step 713.

In step 715, the BS determines whether the UL signaling information is termination, lend, or renewal signaling information. If the UL signaling information is renewal signaling information, the BS reallocates the resources to the MS for use during the allocation duration, considering that the MS intends to further occupy the resources in step 717 and then returns to step 709.

If the UL signaling information is lend signaling information with lending period information, the BS determines whether to lend the resources to another user, considering that the resources can be lent during a lending period in step 719. If it is determined to lend the resources to another user, the BS lends the resources to the user based on the full resource allocation information such as MAP information in step 721 and decodes data received from the user during the lending period in step 723. In step 725, the BS monitors expiration of the lending period. Upon expiration of the lending period, the BS reallocates the resources to the privileged MS in step 727 and returns to step 709. In this case, the MS keeps its privilege to the resources granted in step 701 and the resources can be lent to another user during the lending period in steps 721 to 725. On the other hand, if the BS determines not to lend the resources to another user in step 719, it waits for the lending period in step 725 and then proceeds to step 727. Thus, the resources are not wasted, while the MS is kept connected.

If it is determined that the UL signaling information is termination signaling information in block 715, the BS ends the resource allocation, considering that the MS intends to release the resources and then ends the algorithm of the present invention. Thus, the BS transfers the privilege to the resources to another user.

Figure 8:
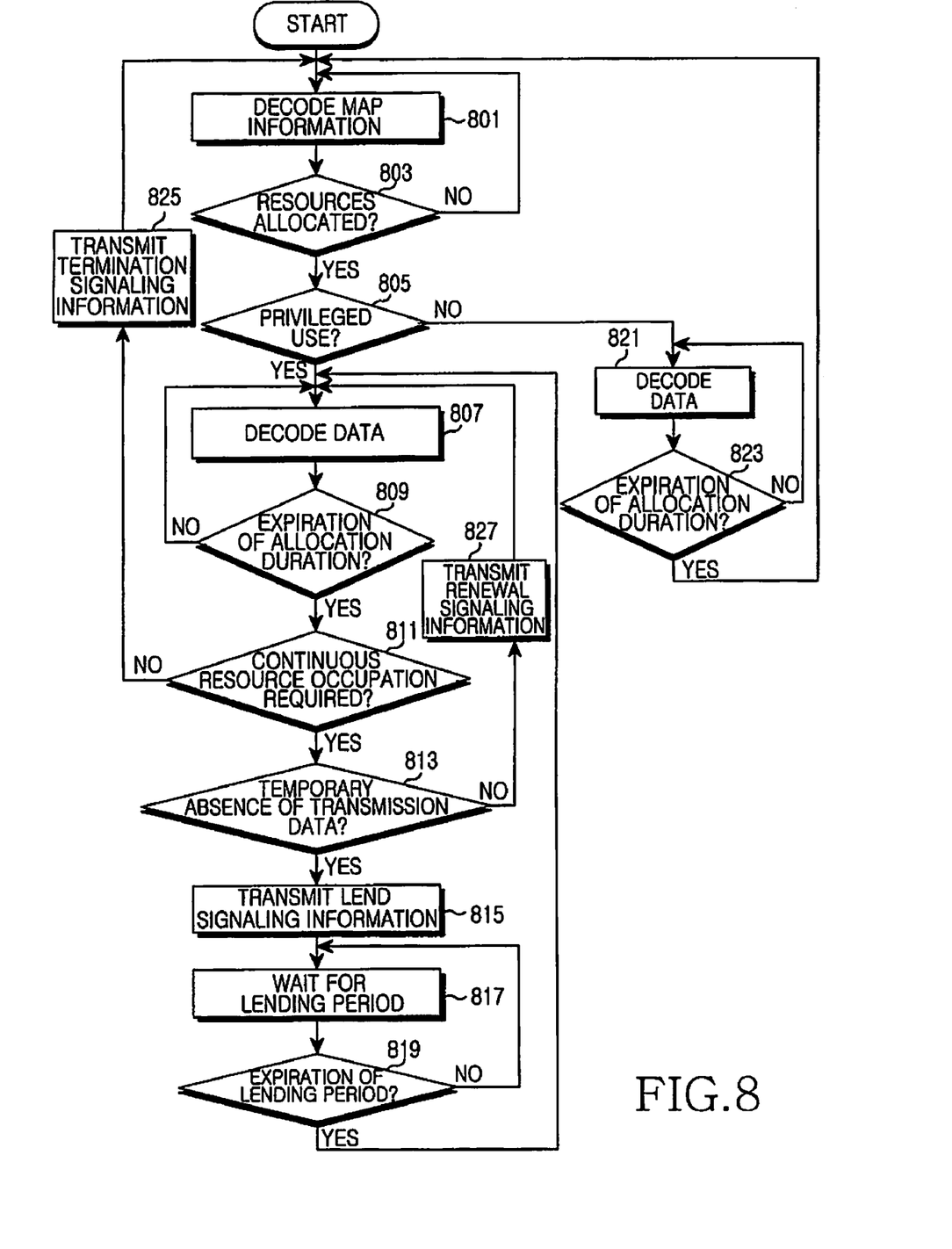
FIG. 8 is a flowchart illustrating a renewal-based resource allocation method for uplink resources in the MS in the BWA system according to an embodiment of the present invention.

FIG. 8 is a flowchart illustrating a renewal-based resource allocation method for uplink resources in the MS in the BWA system according to an embodiment of the present invention.

Referring to FIG. 8, the MS receives full resource allocation information such as MAP information from the BS and decodes it in step 801. In step 803, the MS determines based on the full resource allocation information whether new uplink resources have been allocated to it. If new uplink resources have not been allocated, the MS returns to step 801. If new uplink resources have been allocated, the MS determines whether it is given a privileged use or a temporary use concerning the resources in step 805.

If the MS is not privileged to the resources, it transmits uplink data in the allocated resources during an allocation duration indicated by the resource allocation information in step 821 and determines whether the allocation duration has elapsed in step 823. If allocation still lasts, the MS returns to step 821. Upon expiration of the allocation duration, the MS returns to step 801.

If the MS is privileged to the allocated resources, it transmits uplink data in the allocated resources during the allocation duration indicated by the resource allocation information in step 807 and determines whether the allocation duration has elapsed in step 809. If the allocation duration still lasts, the MS returns to step 807. Upon expiration of the allocation duration, the MS determines whether to further occupy the resources in step 811.

If determining not to further occupy the resources, the MS transmits termination signaling information to the BS, when necessary in step 825 and returns to step 801. If determining to further occupy the resources, the MS determines whether there is a temporary absence of transmission data for the BS in step 813. If the MS needs to further occupy the resources but transmission data is temporarily absent, the MS transmits lend signaling information including lending period information to the BS, when necessary in step 815 and waits for the lending period in step 817. In step 819, the MS monitors expiration of the lending period. If the lending period still lasts, the MS returns to step 817. Upon expiration of the lending period, the MS returns to step 807. If the MS has transmission data for the BS in step 813, it transmits renewal signaling information to the BS when necessary in step 827 and returns to step 807.

Explicit transmission of renewal signaling information, termination signaling information, or lend signaling information in relation to uplink resource allocation can be considered in two ways.

In one such way the MS piggybacks information indicating whether the allocated resources are renewed, terminated, or lent onto data at the last transmission time of the allocated resources, if the MS has a data channel. The information can be a 1-bit indicator. Or an indicator of two or more bits can be used to provide additional information such as operation mode change information as well as the renewal, termination or lend signaling information. For example, the piggybacked information may have the following values.

0: renew or lend, 1: not renew (resource allocation termination)

0: renew, 1: keep connection+lend

00: renew, 01: keep connection+lend (basic allocation unit), 10: keep connection+lend (basic allocation unit× predetermined number), 11: not renew The other way is that when the user has a DL ACK channel for downlink data, the renewal signaling information, termination signaling information, or lend signaling information is transmitted in the DL ACK signal. For example, a 2-bit DUL ACK signal may carry the following information.

00: NACK, 01: ACK+resource allocation termination, 11: ACK+renew, 10:ACK+lend     00: NACK, 01: ACK+resource allocation termination, 11: ACK+renew or lend, 10:NACK+renew or lend If the DL ACK signal has more bits, it can carry more information as follows.

000: NACK,
      001: NACK+resource allocation termination
      010: NACK+renew
      011: NACK+keep connection and lend for predetermined period
      100: ACK
      101: ACK+resource allocation termination
      110: ACK+renew 111: ACK+keep connection and lend for predetermined period The above two methods can be used in combination according to the type of resources (characteristics of DL/UL resources).

It can be further contemplated that two of the renewal signaling information, termination signaling information, and lend signaling information are transmitted explicitly in at least one of the two methods and the other signaling information is not transmitted, virtually implicitly transmitted. For example, provided that the lend signaling information and the renewal signaling information are explicitly transmitted and the termination signaling information is not transmitted, when the BS receives none of the signaling information at the end of the resource allocation, it determines that the resource allocation is terminated. Provided that the lend signaling information and the termination signaling information are explicitly transmitted and the termination signaling information is not transmitted, when the BS receives none of the signaling information at the end of the resource allocation, it determines that the resource allocation is renewed.

As is apparent from the above description, the present invention provides an apparatus and method for renewal-based allocation of downlink and uplink resources in a BWA system. Therefore, if continuous resource allocation is required for a user, the present invention obviates the need for transmitting resource allocation information with a large overhead each time and allows resources of the user to be lent to another user, when the user is placed in a short idle period.

While the invention has been shown and described with reference to certain preferred embodiments thereof, it will be understood by those skilled in the art that various changes in form and details may be made therein without departing from the spirit and scope of the present invention as defined by the appended claims and their equivalents.

What is claimed is:

1. A method for allocating resources in a Base Station (BS) in a wireless access system, the method comprising:
    allocating, by the BS, resources to a Mobile Station (MS) by resource allocation information;
    determining, by the BS, both of whether the MS requires continuous resource allocation and whether the MS does not have transmission data temporarily, when a resource allocation duration for downlink resources allocated to the MS has expired;
    performing, by the BS, one of resource allocation termination, resource allocation renewal, and temporary resource lending to another MS according to the determination, and transmitting information for updating the resource allocation information to the MS, and
    wherein the performing step comprise:
    terminating the resource allocation, if the MS does not require continuous resource allocation;
    renewing the resource allocation, if the MS requires continuous resource allocation and continuously has transmission data; and
    determining whether to lend the allocated resources, lending the resources to another MS during a lending period when the BS determines to lend the allocated resources, and then reallocating the resources to the MS, if the MS requires continuous resource allocation and does not have transmission data temporarily.

2. The method of claim 1, wherein the information for updating the resource allocation information is one of termination signaling information, lend signaling information, and renewal signaling information.

3. The method of claim 1, wherein one piece of the information for updating the resource allocation information is not transmitted explicitly to the MS and other pieces of the information for updating the resource allocation information are transmitted explicitly to the MS.

4. The method of claim 1, wherein the resource allocation information includes an indicator indicating whether the MS is given a privileged use or a temporary use of the allocated resources, and the MS has a privileged use of the allocated resources.

5. The method of claim 4, wherein if the indicator indicates that the MS is given a temporary use of the allocated resources, the performance comprises terminating the resource allocation, upon expiration of the resource allocation duration.

6. The method of claim 4, further comprising transferring the privileged use of the allocated resources to another MS, when the resource allocation is terminated.

7. The method of claim 1, wherein the transmission comprises transmitting the information for updating the resource allocation information to the MS by piggybacking the information for updating the resource allocation information onto data at a last transmission time of the allocated resources, on a separate broadcasting channel, or using a predetermined number of bits in an ACKnowledgement (ACK) signal for downlink or uplink data.

8. The method of claim 1, further comprising:
    receiving information for updating the resource allocation information, if the resource allocation duration has expired; and
    performing one of resource allocation termination, resource allocation renewal, and temporary resource lending to another MS according to the received information.

9. The method of claim 8, wherein the performance according to the received information comprises:
    terminating the resource allocation, if the received information is termination signaling information;
    renewing the resource allocation, if the received information is renewal signaling information; and
    determining whether to lend the allocated resources, lending the resources to another MS during a lending period when the BS determines to lend the allocated resources, and then reallocating the resources to the MS, if the received information is lend signaling information.

10. A method for receiving resource allocation information in a Mobile Station (MS) in a wireless access system, the method comprising:
    being allocated resources for which a privileged use is given to the MS from a Base Station (BS) by resource allocation information;
    receiving, by the MS, information for updating the resource allocation information from the BS, if a resource allocation duration for downlink resources allocated to the MS has expired; and
    continuing using the allocated resources, when the received information for updating the resource allocation information is renewal signaling information, and waiting for a lending period and being reallocated the allocated resources, when the received information for updating the resource allocation information is lend signaling information.

11. The method of claim 10, further comprising, if the MS is allocated to resources for which a temporary use is given to the MS, terminating use of the allocated resource, when the resource allocation duration has expired.

12. The method of claim 10, wherein the information for updating the resource allocation information is one of termination signaling information, lend signaling information, and renewal signaling information.

13. The method of claim 10, wherein one piece of the information for updating the resource allocation information is not received explicitly from the BS and the other pieces of the information for updating the resource allocation information are received explicitly from the BS.

14. The method of claim 10, wherein the reception comprises receiving from the BS the information for updating the resource allocation information piggybacked onto data at a last transmission time of the allocated resources, receiving the information for updating the resource allocation information on a separate broadcasting channel from the BS, or receiving from the BS the information for updating the resource allocation information in a predetermined number of bits of an ACKnowledgement (ACK) signal for downlink or uplink data.

15. The method of claim 10, further comprising:
determining at least one of whether the MS requires continuous resource allocation and whether the MS does not have transmission data temporarily, when the resource allocation duration has expired; and
transmitting information for updating the resource allocation information to the BS according to the determination.

16. The method of claim 15, wherein the transmission comprises:
transmitting termination signaling information to the BS, if the MS does not require continuous resource allocation;
transmitting renewal signaling information to the BS, if the MS requires continuous resource allocation and has transmission data continuously; and
transmitting lend signaling information to the BS, if the MS requires continuous resource allocation and does not have transmission data temporarily.

17. An apparatus of a Base Station (BS) in a wireless access system, the apparatus comprising:
a resource allocator for allocating resources to a Mobile Station (MS) by resource allocation information, determining both of whether the MS requires continuous resource allocation and whether the MS does not have transmission data temporarily, when a resource allocation duration for downlink resources allocated to the MS has expired, and performing one of resource allocation termination, resource allocation renewal, and temporary resource lending to another MS according to the determination; and
an update information transmitter for transmitting information for updating the resource allocation information to the MS,
wherein the resource allocator terminates the resource allocation, if the MS does not require continuous resource allocation, renews the resource allocation, if the MS requires continuous resource allocation and continuously has transmission data, and determines whether to lend the allocated resources, lends the resources to another MS during a lending period when the BS determines to lend the allocated resources, and then reallocates the resources to the MS, if the MS requires continuous resource allocation and does not have transmission data temporarily.

18. The apparatus of claim 17, further comprising an update information receiver for providing information for updating the resource allocation information received from the MS to the resource allocator, wherein the resource allocator performs one of resource allocation termination, resource allocation renewal, and temporary resource lending to another MS according to the information for updating the resource allocation information, when the resource allocation duration has expired.

19. An apparatus of a Mobile Station (MS) in a wireless access system, the apparatus comprising:
a MAP interpreter for being allocated resources for which a privileged use is given to the MS from a Base Station (BS) by resource allocation information, and performing one of terminating use of the allocated resources, continuing using the allocated resources, and waiting for a lending period and resuming use of the allocated resources, according to information for updating the resource allocation information received from an update information receiver; and
the update information receiver for providing the information for updating the resource allocation information received from the BS to the MAP interpreter,
wherein the map (MAP) interpreter continues using the allocated resources, when the received information for updating the resource allocation information is renewal signaling information, and waits for a lending period and being reallocated the allocated resources, when the received information for updating the resource allocation information is lend signaling information.

20. The apparatus of claim 19, wherein the information for updating the resource allocation information is one of termination signaling information, lend signaling information, and renewal signaling information.

21. The apparatus of claim 19, wherein the MAP interpreter determines at least one of whether the MS requires continuous resource allocation and whether the MS does not have transmission data temporarily, when the resource allocation duration has expired, and outputs information for updating the resource allocation information according to the determination, further comprising an update information transmitter for transmitting the information for updating the resource allocation information to the BS.

22. The apparatus of claim 21, wherein the MAP interpreter outputs termination signaling information, if the MS does not require continuous resource allocation, outputs renewal signaling information, if the MS requires continuous resource allocation and has transmission data continuously, and outputs lend signaling information, if the MS requires continuous resource allocation and does not have transmission data temporarily.

* * * * *